US010403011B1

(12) United States Patent
Brakeley et al.

(10) Patent No.: US 10,403,011 B1
(45) Date of Patent: Sep. 3, 2019

(54) PASSING SYSTEM WITH AN INTERACTIVE USER INTERFACE

(71) Applicant: Palantir Technologies Inc., Palo Alto, CA (US)

(72) Inventors: Nathaniel Brakeley, New York, NY (US); Deborah Hwang, Arlington, VA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 200 days.

(21) Appl. No.: 15/652,641

(22) Filed: Jul. 18, 2017

(51) Int. Cl.
G08G 1/00 (2006.01)
G06T 11/20 (2006.01)
G06F 3/0482 (2013.01)
G06F 17/24 (2006.01)
G06F 3/0484 (2013.01)

(52) U.S. Cl.
CPC .......... G06T 11/206 (2013.01); G06F 3/0482 (2013.01); G06F 3/04845 (2013.01); G06F 17/246 (2013.01); G06Q 2240/00 (2013.01)

(58) Field of Classification Search
CPC ............... G06F 3/04847; G06F 3/0482; G06F 3/04842; G06F 3/0488; G06F 3/04883; G06F 3/0346; G06F 3/04886; G06F 3/04845; G06F 17/246; G06T 11/206; G06Q 2240/00
(Continued)

(56) References Cited

U.S. PATENT DOCUMENTS 4,899,161 A 2/1990 Morin et al.
4,958,305 A 9/1990 Piazza
(Continued)

FOREIGN PATENT DOCUMENTS

DE 102014103482 9/2014
DE 102013222023 1/2015
(Continued)

OTHER PUBLICATIONS

"A First Look: Predicting Market Demand for Food Retail using a Huff Analysis," TRF Policy Solutions, Jul. 2012, pp. 30.
(Continued)

Primary Examiner — Scott T Baderman
Assistant Examiner — Hassan Mrabi
(74) Attorney, Agent, or Firm — Knobbe Martens Olson & Bear LLP

(57) ABSTRACT

Systems and methods for generating an interactive user interface for displaying and/or processing passing information data. An interactive user interface can be generated displaying a first portion including an interactive bubble chart configured to display a first set of passing information related to instances of a first individual passing a first plurality of markers. The interactive user interface can also include a second portion including a selectable user interface element for providing one or more search criteria for identifying other individuals in search for other individuals with passings related to passing of the first individual. One or more other individuals that satisfy the search criteria can be displayed to the user. As the user selects a second individual, the interactive user interface can be updated to display a second set of passing information related to one or more instances of the second individual passing the first plurality of markers.

20 Claims, 6 Drawing Sheets

(58) Field of Classification Search
USPC .......................................................... 715/771
See application file for complete search history.

(56) References Cited

U.S. PATENT DOCUMENTS

| | | | |
|---|---|---|---|
| 5,109,399 A | 4/1992 | Thompson |
| 5,329,108 A | 7/1994 | Lamoure |
| 5,632,009 A | 5/1997 | Rao et al. |
| 5,670,987 A | 9/1997 | Doi et al. |
| 5,754,182 A | 5/1998 | Kobayashi |
| 5,781,195 A | 7/1998 | Marvin |
| 5,781,704 A | 7/1998 | Rossmo |
| 5,798,769 A | 8/1998 | Chiu et al. |
| 5,845,300 A | 12/1998 | Comer |
| 6,057,757 A | 5/2000 | Arrowsmith et al. |
| 6,091,956 A | 7/2000 | Hollenberg |
| 6,157,747 A | 12/2000 | Szeliski et al. |
| 6,161,098 A | 12/2000 | Wallman |
| 6,173,067 B1 | 1/2001 | Payton et al. |
| 6,178,432 B1 | 1/2001 | Cook et al. |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,389,289 B1 | 5/2002 | Voce et al. |
| 6,414,683 B1 | 7/2002 | Gueziec |
| 6,456,997 B1 | 9/2002 | Shukla |
| 6,483,509 B1 | 11/2002 | Rabenhorst |
| 6,529,900 B1 | 3/2003 | Patterson et al. |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,662,103 B1 | 12/2003 | Skolnick et al. |
| 6,674,434 B1 | 1/2004 | Chojnacki et al. |
| 6,714,936 B1 | 3/2004 | Nevin, III |
| 6,757,445 B1 | 6/2004 | Knopp |
| 6,775,675 B1 | 8/2004 | Nwabueze et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,375,732 B2 | 5/2008 | Arcas |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,457,706 B2 | 11/2008 | Malero et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,519,470 B2 | 4/2009 | Brasche et al. |
| 7,525,422 B2 | 4/2009 | Bishop et al. |
| 7,529,195 B2 | 5/2009 | Gorman |
| 7,529,727 B2 | 5/2009 | Arning et al. |
| 7,529,734 B2 | 5/2009 | Dirisala |
| 7,539,666 B2 | 5/2009 | Ashworth et al. |
| 7,546,245 B2 | 6/2009 | Surpin et al. |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,640,173 B2 | 12/2009 | Surpin et al. |
| 7,663,621 B1 | 2/2010 | Allen et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,067 B2 | 5/2010 | Surpin et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,945,852 B1 | 5/2011 | Pilskains |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,010,886 B2 | 8/2011 | Gusmorino et al. |
| 8,015,487 B2 | 9/2011 | Roy et al. |
| 8,019,709 B2 | 9/2011 | Norton et al. |
| 8,024,778 B2 | 9/2011 | Cash et al. |
| 8,036,632 B1 | 10/2011 | Cona et al. |
| 8,065,080 B2 | 11/2011 | Koch |
| 8,082,172 B2 | 12/2011 | Chao et al. |
| 8,085,268 B2 | 12/2011 | Carrino et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,325,178 B1 | 12/2012 | Doyle, Jr. |
| 8,352,881 B2 | 1/2013 | Champion et al. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,411,046 B2 | 4/2013 | Kruzeniski et al. |
| 8,412,234 B1 | 4/2013 | Gatmir-Motahari et al. |

(56) References Cited

U.S. PATENT DOCUMENTS

| | | |
|---|---|---|
| 8,412,707 B1 | 4/2013 | Mianji |
| 8,422,825 B1 | 4/2013 | Neophytou et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,510,743 B2 | 8/2013 | Hackborn et al. |
| 8,514,082 B2 | 8/2013 | Cova et al. |
| 8,514,229 B2 | 8/2013 | Cervelli et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,554,840 B1 | 10/2013 | Milgramm |
| 8,564,596 B2 | 10/2013 | Carrino et al. |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,597 B2 | 3/2014 | Buehler et al. |
| 8,676,857 B1 | 3/2014 | Adams et al. |
| 8,689,108 B1 | 4/2014 | Duffield et al. |
| 8,707,185 B2 | 4/2014 | Robinson et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,756,244 B2 | 6/2014 | Dassa et al. |
| 8,768,009 B1 | 7/2014 | Smith |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,799,812 B2 | 8/2014 | Parker |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,486 B2 | 10/2014 | Tamayo |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 2001/0021936 A1 | 9/2001 | Bertram |
| 2002/0003539 A1 | 1/2002 | Abe |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0130867 A1 | 9/2002 | Yang et al. |
| 2002/0130907 A1 | 9/2002 | Chi et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0039948 A1 | 2/2003 | Donahue |
| 2003/0052896 A1 | 3/2003 | Higgins et al. |
| 2003/0103049 A1 | 6/2003 | Kindratenko et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0030492 A1 | 2/2004 | Fox et al. |
| 2004/0032432 A1 | 2/2004 | Baynger |
| 2004/0039498 A1 | 2/2004 | Ollis et al. |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0098236 A1 | 5/2004 | Mayer et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0194549 A1 | 10/2004 | Noel |
| 2004/0210847 A1 | 10/2004 | Berson et al. |
| 2004/0212518 A1* | 10/2004 | Tajima .................. G07B 15/02 340/928 |
| 2004/0221223 A1 | 11/2004 | Yu et al. |
| 2004/0260702 A1 | 12/2004 | Cragun et al. |
| 2004/0267746 A1 | 12/2004 | Marcjan et al. |
| 2005/0027705 A1 | 2/2005 | Sadri et al. |
| 2005/0028094 A1 | 2/2005 | Allyn |
| 2005/0031197 A1 | 2/2005 | Knopp |
| 2005/0034062 A1 | 2/2005 | Bufkin et al. |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0097018 A1* | 5/2005 | Takida ................. G06Q 20/102 705/35 |
| 2005/0125715 A1 | 6/2005 | Di Franco et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182502 A1 | 8/2005 | Iyengar |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2005/0267652 A1 | 12/2005 | Allstadt et al. |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0146050 A1 | 7/2006 | Yamauchi |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0251307 A1 | 11/2006 | Florin et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0150369 A1 | 6/2007 | Zivin |
| 2007/0174760 A1 | 7/2007 | Chamberlain et al. |
| 2007/0188516 A1 | 8/2007 | Loup et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208681 A1 | 9/2007 | Bucholz |
| 2007/0208736 A1 | 9/2007 | Tanigawa et al. |

(56) References Cited

U.S. PATENT DOCUMENTS

| | | |
|---|---|---|
| 2007/0240062 A1 | 10/2007 | Christena et al. |
| 2007/0258642 A1 | 11/2007 | Thota |
| 2007/0266336 A1 | 11/2007 | Nojima et al. |
| 2007/0294643 A1 | 12/2007 | Kyle |
| 2008/0010605 A1 | 1/2008 | Frank |
| 2008/0016216 A1 | 1/2008 | Worley et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0126951 A1 | 5/2008 | Sood et al. |
| 2008/0155440 A1 | 6/2008 | Trevor et al. |
| 2008/0162616 A1 | 7/2008 | Gross et al. |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0195608 A1 | 8/2008 | Clover |
| 2008/0208462 A1* | 8/2008 | Tanaka ............... G01C 21/3453 701/414 |
| 2008/0222295 A1 | 9/2008 | Robinson et al. |
| 2008/0223834 A1 | 9/2008 | Griffiths et al. |
| 2008/0228512 A1 | 9/2008 | Calkins et al. |
| 2008/0229056 A1 | 9/2008 | Agarwal et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0100018 A1 | 4/2009 | Roberts |
| 2009/0115786 A1 | 5/2009 | Shmiasaki et al. |
| 2009/0119309 A1 | 5/2009 | Gibson et al. |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0158185 A1 | 6/2009 | Lacevic et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0174575 A1* | 7/2009 | Allen .................. G07B 15/063 340/933 |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076968 A1 | 3/2010 | Boyns et al. |
| 2010/0100963 A1 | 4/2010 | Mahaffey |
| 2010/0103124 A1 | 4/2010 | Kruzeniski et al. |
| 2010/0106420 A1 | 4/2010 | Mattikalli et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0022312 A1 | 1/2011 | McDonough et al. |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0185316 A1 | 7/2011 | Reid et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0238553 A1 | 9/2011 | Raj et al. |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084118 A1 | 4/2012 | Bai et al. |
| 2012/0105632 A1 | 5/2012 | Renkis |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159363 A1 | 6/2012 | DeBacker et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0203708 A1 | 8/2012 | Psota et al. |
| 2012/0206469 A1 | 8/2012 | Hulubei et al. |
| 2012/0208636 A1 | 8/2012 | Feige |
| 2012/0221511 A1 | 8/2012 | Gibson et al. |

(56) References Cited

U.S. PATENT DOCUMENTS

| | | |
|---|---|---|
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0018796 A1 | 1/2013 | Kolhatkar et al. |
| 2013/0021445 A1 | 1/2013 | Cossette-Pacheco et al. |
| 2013/0024202 A1 | 1/2013 | Harris et al. |
| 2013/0046635 A1 | 2/2013 | Grigg et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0076732 A1 | 3/2013 | Cervelli et al. |
| 2013/0078943 A1 | 3/2013 | Biage et al. |
| 2013/0097482 A1 | 4/2013 | Marantz et al. |
| 2013/0100134 A1 | 4/2013 | Cervelli et al. |
| 2013/0101159 A1 | 4/2013 | Chao et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0157234 A1 | 6/2013 | Gulli et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0282723 A1 | 10/2013 | Petersen et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0311375 A1 | 11/2013 | Priebatsch |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0188847 A1 | 7/2014 | Tang et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0267294 A1 | 9/2014 | Ma |
| 2014/0267295 A1 | 9/2014 | Sharma |
| 2014/0279824 A1 | 9/2014 | Tamayo |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0361899 A1 | 12/2014 | Layson |
| 2015/0019394 A1 | 1/2015 | Unser et al. |
| 2015/0029176 A1 | 1/2015 | Baxter et al. |
| 2015/0046870 A1 | 2/2015 | Goldenberg et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2018/0005458 A1* | 1/2018 | Iehara .................... G07B 15/00 |

FOREIGN PATENT DOCUMENTS

| | | |
|---|---|---|
| DE | 102014215621 | 2/2015 |
| EP | 0763201 | 3/1997 |
| EP | 1672527 | 6/2006 |
| EP | 2551799 | 1/2013 |
| EP | 2560134 | 2/2013 |
| EP | 2575107 | 4/2013 |
| EP | 2778913 | 9/2014 |
| EP | 2778977 | 9/2014 |
| EP | 2778983 | 9/2014 |
| EP | 2779082 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 95/032424 | 11/1995 |
| WO | WO 2000/009529 | 2/2000 |
| WO | WO 2002/065353 | 8/2002 |
| WO | WO 2004/057268 | 7/2004 |
| WO | WO 2005/013200 | 2/2005 |
| WO | WO 2005/104736 | 11/2005 |
| WO | WO 2008/064207 | 5/2008 |
| WO | WO 2009/061501 | 5/2009 |
| WO | WO 2009/123975 | 10/2009 |
| WO | WO 2010/000014 | 1/2010 |
| WO | WO 2010/030913 | 3/2010 |
| WO | WO 2011/058507 | 5/2011 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.

"A Word About Banks and the Laundering of Drug Money," Aug. 18, 2012, http://www.golemxiv.co.uk/2012/08/a-word-about-banks-and-the-laundering-of-drug-money/.

(56) References Cited

OTHER PUBLICATIONS

Acklen, Laura, "Absolute Beginner's Guide to Microsoft Word 2003," Dec. 24, 2003, pp. 15-18, 34-41, 308-316.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
"Andy Turner's GISRUK 2012 Notes" <https://docs.google.com/document/d/1cTmxg7mVx5gd89lqblCYvCEnHA4QAivH4l4WpyPsqE4/edit?pli=1> printed Sep. 16, 2013 in 15 pages.
Barnes et al., "Viewshed Analysis", GIS-ARC/INFO 2001, <www.evsc.virginia.edu/~jhp7e/evsc466/student_pres/Rounds.pdf>.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
"The FASTA Program Package," fasta-36.3.4, Mar. 25, 2011, pp. 29.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.
Gorr et al., "Crime Hot Spot Forecasting: Modeling and Comparative Evaluation", Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al., "Analyzing Social Media Networks with NodeXL: Insights from a Connected World", Chapter 4, pp. 53-67 and Chapter 10, pp. 143-164, published Sep. 2010.
Haralick et al., "Image Analysis Using Mathematical Morphology," Pattern Analysis and Machine Intelligence, IEEE Transactions, Jul. 1987, vol. PAMI-9, No. 4, pp. 532-550.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Ipbucker, C., "Inverse Transformation for Several Pseudo-cylindrical Map Projections Using Jacobian Matrix," ICCSA 2009, Part 1 LNCS 5592, pp. 553-564.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Levine, N., "Crime Mapping and the Crimestat Program," Geographical Analysis, 2006, vol. 38, pp. 41-56.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Mandagere, Nagapramod, "Buffer Operations in GIS," <http://www-users.cs.umn.edu/~npramod/enc_pdf.pdf> retrieved Jan. 28, 2010, pp. 7.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v-office.14%29.aspx> as printed Apr. 4, 2014 in 17 pages.

(56) References Cited

OTHER PUBLICATIONS

Microsoft Office—Visio, "About connecting shapes," <http://office.microsoft.com/en-us/visio-help/about-connecting-shapes-HP085050369.aspx> printed Aug. 4, 2011 in 6 pages.

Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.

Mizrachi, Ilene, "Chapter 1: GenBank: The Nuckeotide Sequence Database," The NCBI Handbook, Oct. 2002, pp. 1-14.

Murray, C., Oracle Spatial Developer's Guide—6 Coordinate Systems (Spatial Reference Systems), <http://docs.oracle.com/cd/B28359_01/appdev.111/b28400.pdf>, Jun. 2009.

Nierman, "Evaluating Structural Similarity in XML Documents", 6 pages, 2002.

Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.

Open Street Map, "Amm's Diary:Unconnected ways and other data quality issues," http://www.openstreetmap.org/user/amm/diary printed Jul. 23, 2012 in 3 pages.

Palmas et al., "An Edge-Bunding Layout for Interactive Parallel Coordinates" 2014 IEEE Pacific Visualization Symposium, pp. 57-64.

POI Editor, "How To: Create Your Own Points of Interest," <http://www.poieditor.com/articles/how_to_create_your_own_points_of_interest/> printed Jul. 22, 2012 in 4 pages.

"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.

Pozzi et al., "Vegetation and Population Density in Urban and Suburban Areas in the U.S.A." Third International Symposium of Remote Sensing of Urban Areas Istanbul, Turkey, Jun. 2002, pp. 8.

Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.

Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Reibel et al., "Areal Interpolation of Population Counts Using Pre-classi_ed Land Cover Data," Population Research and Policy Review, 2007, vol. 26, pp. 619-633.

Reibel, M., "Geographic Information Systems and Spatial Data Processing in Demography: a Review," Population Research and Policy Review, 2007, vol. 26, pp. 601-618.

Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.

Rouse, Margaret, "OLAP Cube," <http://searchdatamanagement.techtarget.com/definition/OLAP-cube>, Apr. 28, 2012, pp. 16.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

Snyder, "Map Projections—A Working Manual," U.S. Geological Survey Professional paper 1395, United States Government Printing Office, Washington: 1987, pp. 11-21 and 60-70.

Sonris, "Using the Area of Interest Tools," <http://web.archive.org/web/20061001053327/http://sonris-www.dnr.state.la.us/gis/instruct_files/tutslide12> printed Jan. 3, 2013 in 1 page.

Tangelder et al., "Freeform Shape Matching Using Minkowski Operations," The Netherlands, Jun. 1996, pp. 12.

Thompson, Mick, "Getting Started with GEO," Getting Started with GEO, Jul. 26, 2011.

Umagandhi et al., "Search Query Recommendations Using Hybrid User Profile with Query Logs," International Journal of Computer Applications, vol. 80, No. 10, Oct. 1, 2013, pp. 7-18.

Valentini et al., "Ensembles of Learning Machines", M. Marinaro and R. Tagliaferri (Eds.): WIRN VIETRI 2002, LNCS 2486, pp. 3-20.

VB Forums, "Buffer A Polygon," Internet Citation, <http://www.vbforums.com/showthread.php?198436-Buffer-a-Polygon>, Specifically Thread #1, #5 & #11 retrieved on May 2, 2013, pp. 8.

Vivid Solutions, "JTS Topology Suite: Technical Specifications," <http://www.vividsolutions.com/jts/bin/JTS%20Technical%20Specs.pdf> Version 1.4, 2003, pp. 36.

Wikipedia, "Douglas_Peucker-Algorithms," <http://de.wikipedia.org/w/index.php?title-Douglas-Peucker-Algorithmus&oldid=91846042> printed Jul. 2011, pp. 2.

Wikipedia, "Federated Database System," Sep. 7, 2013, retrieved from the internet on Jan. 27, 2015 http://en.wikipedia.org/w/index.php?title-Federated_database_system&oldid=571954221.

Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.

Wongsuphasawat et al., "Visual Analytics for Transportation Incident Data Sets," Transportation Research Record 2138, 2009, pp. 135-145.

Woodbridge, Stephen, "[gens-devel] Polygon simplification," <http://lists.osgeo.org/pipermail/geos-devel/2011-May/005210.html> dated May 8, 2011, pp. 3.

Yang et al., "HTML Page Analysis Based on Visual Cues", A129, pp. 859-864, 2001.

\* cited by examiner

FIG. 4

PASSING SYSTEM WITH AN INTERACTIVE USER INTERFACE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for marker passing data integration, analysis, and visualization. More specifically, systems and methods are disclosed that facilitate calculation and presentation of passing analysis. Furthermore, systems and methods are disclosed for the collection and processing of passing data from various data sources.

BACKGROUND

Embodiments of the present disclosure generally relate to passing data processing and visualization. Marker management systems, such as toll management applications, are available from a number of providers. Some of the marker management systems may provide a user interface displaying the passing, marker, and/or co-passing information.

SUMMARY

The systems, and methods described herein each have several aspects, no single one of which is solely responsible for its desirable attributes. Without limiting the scope of this disclosure, several non-limiting features will now be discussed briefly.

Using current available marker (e.g., toll) management systems, information about vehicles passing a marker can be recorded. However, most systems cannot collect and process data in an efficient and comprehensive manner as the systems cannot collect individual data associated with the vehicles (e.g., vehicle owner data, vehicle passenger data, etc.). Additionally, as most systems store and/or collect vehicle data in different formats and/or require different types of vehicle data, the systems do not provide an efficient platform to process all the stored/collected data in efficient means. Furthermore, the systems do not provide interactive user interfaces for users to view and interact with the processed data in an efficient way or provide a more illustrative way for the user to analyze the processed data.

The system is configured to automatically access data from a plurality of data sources, and convert the data to a common format. The system can also communicate with other marker passing (e.g., toll) management systems and/or any other vehicle related systems to collect data. The data can include vehicle data and/or individual data. The vehicle data can include information associated with a vehicle, such as its ownership information, passenger information (e.g., which individuals are in the vehicle) at a specific time of record, color, license plate information, etc. The individual data can include information associated with the individual, such as name, age, gender, vehicle ownership, ride information (e.g., which vehicle he is in) at a specific time of record, etc. In some embodiments, to improve efficiency, the system can first map the related data based on one or more pre-defined rules and store the mapping the database.

The system can provide a user an interactive user interface for displaying data associated with a first individual. The interactive user interface, in some cases, can be defined by the user. As the user makes requests to view information related to a second individual, the system can automatically retrieve related data associated with the second individual and update the interactive user interface to display a comparison of data associated with the two individuals. The interactive user interface can include comparisons of data associated with the two individuals, including visualizations such as timelines and bubble charts with the data visually overlapping to provide insights to the user.

Additionally, the system can generate a second interactive user interface to display detailed vehicle information associated with to a specific marker, which gives the user a more illustrative way to analyze the data. The second user interface includes a matrix visualization of vehicle information, where a first dimension of the matrix represents buckets of time, and a second dimension of the matric represents different lanes by which vehicles passed the specific marker. The second interactive user interface can provide insights to a user regarding timing and sequencing of vehicles passing the marker, and can include indications of attributes of the vehicles (e.g., color of the vehicles) and options for filtering and highlighting of displayed vehicles.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, image data (including medical images) and may enable a user to more quickly and accurately access, navigate, assess, and digest the image data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, search criteria, etc.), translation and delivery of those inputs to various system components, automatic and dynamic execution of complex processes in response to the input delivery, automatic interaction among various components and processes of the system, and automatic and dynamic updating of the user interfaces (to, for example, display the relevant medical images). The interactions and presentation of data via the interactive user interfaces described herein may accordingly provide cognitive and ergonomic efficiencies and advantages over previous systems.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

According to an embodiment, a system is disclosed. The system comprises a computer readable storage medium having embodied thereon program instructions and one or more processors. The one or more processors are configured to execute the program instructions to cause the system to: generate user interface data configured to be rendered as an interactive user interface. The interactive user interface includes: a first portion including an interactive bubble chart configured to display a first set of passing information related to instances of a first individual passing a first plurality of markers, wherein the bubble charts comprises: indications of one or more days of the week along a first axis; indications of one or more time periods within a day along a second axis orthogonal to the first axis; and at each of a first set of intersections of respective days and time periods, indications in a first format of a quantity of the first individual passing at least one of the first plurality of markers in a respective time period on a respective day of a week, the first set of intersections being determined based on the first set of passing information; and a second portion including a selectable user interface element for providing one or more search criteria for identifying other individuals in a search for other individuals with passings related to passings of the first individual. The one or more processors are further configured to execute the program instructions to cause the system to: receive a first user input providing one or more search criteria via the second portion of the user interface; in response to the first user input: determine, based at least in part on the one or more search criteria, one or more other individuals with passings related to the passings of the first individual; display a list of the one or more other individuals in a third portion of the interactive user interface; receive a second user input selecting a second individual from the list of the one or more other individuals; determine a second set of passing information related to one or more instances of the second individual passing the first plurality of markers; automatically update the bubble chart included in the first portion of the interactive user interface to include: at each of a second set of intersections of respective days and time periods, indications in a second format of a quantity of the second individual passing at least one of the first plurality of markers in a respective time period on a respective day of a week, the second set of intersections being determined based at least partly on the second set of passing information, wherein the indications associated with the first individual and the indications associated with the second individual are configured to overlap one another in the bubble chart, if needed.

According to an embodiment, a computer-implemented method for processing passing information data and generating interactive user interfaces is disclosed. The computer-implemented method comprises, by one or more processors executing program instructions, generating user interface data configured to be rendered as an interactive user interface including: a first portion including an interactive bubble chart configured to display a first set of passing information related to instances of a first individual passing a first plurality of markers, wherein the bubble charts comprises: indications of one or more days of the week along a first axis; indications of one or more time periods within a day along a second axis orthogonal to the first axis; and at each of a first set of intersections of respective days and time periods, indications in a first format of a quantity of the first individual passing at least one of the first plurality of markers in a respective time period on a respective day of a week, the first set of intersections being determined based on the first set of passing information; and a second portion including a selectable user interface element for providing one or more search criteria for identifying other individuals in a search for other individuals with passings in some way related to passings of the first individual. The computer-implemented method further comprises, by one or more processors executing program instructions, receiving a first user input providing one or more search criteria via the second portion of the user interface; in response to the first user input: determining, based at least in part on the one or more search criteria, one or more other individuals with passings related to the passings of the first individual; displaying a list of the one or more other individuals in a third portion of the interactive user interface; receiving a second user input selecting a second individual from the list of the one or more other individuals; determining a second set of passing information related to one or more instances of the second individual passing the first plurality of markers; automatically updating the bubble chart included in the first portion of the interactive user interface to include: at each of a second set of intersections of respective days and time periods, indications in a second format of a quantity of the second individual passing at least one of the first plurality of markers in a respective time period on a respective day of a week, the second set of intersections being determined based at least partly on the second set of passing information, wherein the indications associated with the first individual and the indications associated with the second individual are configured to overlap one another in the bubble chart, if needed.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 4 and 5 illustrate example integrated system user interfaces displaying passing, co-passing, and/or marker information to the user.

DETAILED DESCRIPTION

Figure 1:
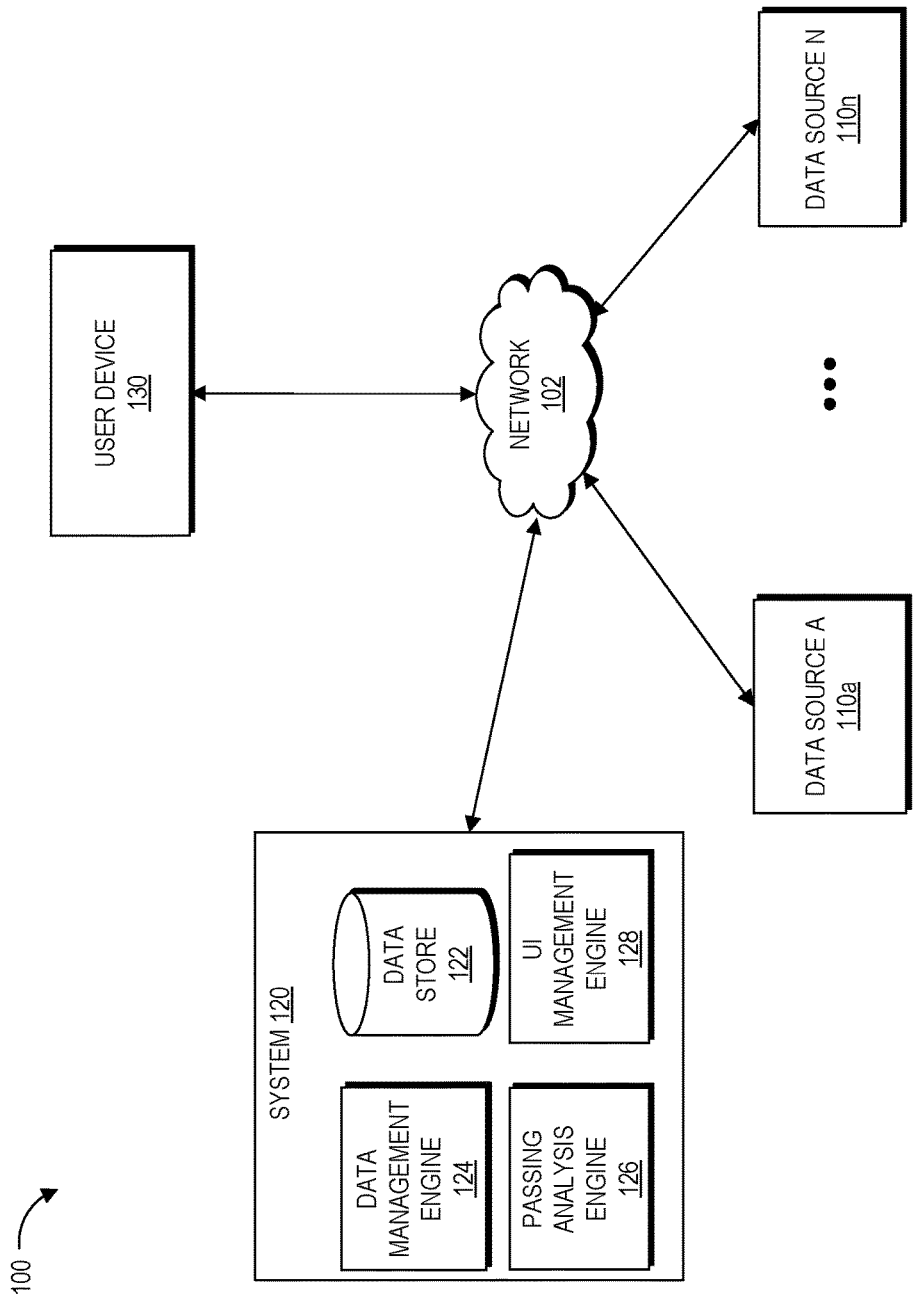
FIG. 1 is a system diagram illustrating an example integrated passing system in an example operating environment, according to an embodiment of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

Using current available marker (e.g., toll) management systems, information about vehicles passing a marker can be recorded. However, most systems cannot collect and process data in an efficient and comprehensive manner as the systems cannot collect individual data associated with the vehicles (e.g., vehicle owner data, vehicle passenger data, etc.). Additionally, as most systems store and/or collect vehicle data in different formats and/or require different types of vehicle data, the systems do not provide an efficient platform to process all the stored/collected data in efficient means. Furthermore, the systems do not provide interactive user interfaces for users to view and interact with the processed data in an efficient way or provide a more illustrative way for the user to analyze the processed data.

The system is configured to automatically access data from a plurality of data sources, and convert the data to a common format. The system can also communicate with other marker passing (e.g., toll) management systems and/or any other vehicle related systems to collect data. The data can include vehicle data and/or individual data. The vehicle data can include information associated with a vehicle, such as its ownership information, passenger information (e.g., which individuals are in the vehicle) at a specific time of record, color, license plate information, etc. The individual data can include information associated with the individual, such as name, age, gender, vehicle ownership, ride information (e.g., which vehicle he is in) at a specific time of record, etc. In some embodiments, to improve efficiency, the system can first map the related data based on one or more pre-defined rules and store the mapping the database.

The system can provide a user an interactive user interface for displaying data associated with a first individual. The interactive user interface, in some cases, can be defined by the user. As the user makes requests to view information related to a second individual, the system can automatically retrieve related data associated with the second individual and update the interactive user interface to display a comparison of data associated with the two individuals. The interactive user interface can include comparisons of data associated with the two individuals, including visualizations such as timelines and bubble charts with the data visually overlapping to provide insights to the user.

Additionally, the system can generate a second interactive user interface to display detailed vehicle information associated with to a specific marker, which gives the user a more illustrative way to analyze the data. The second user interface includes a matrix visualization of vehicle information, where a first dimension of the matrix represents buckets of time, and a second dimension of the matric represents different lanes by which vehicles passed the specific marker. The second interactive user interface can provide insights to a user regarding timing and sequencing of vehicles passing the marker, and can include indications of attributes of the vehicles (e.g., color of the vehicles) and options for filtering and highlighting of displayed vehicles.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store/Source: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage). Data sources may include any application, system, etc. that can provide the system with availabilities of entities and/or locations, including but not limited to: any marker management applications, any third party personnel management systems, any internal logs, etc. In some examples, data source can also include data manually input by entities.

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may combined and/or separated in any appropriate way into one or more databases, one or more tables of one or more databases, etc.

Marker: Any boundary, whether or not physically indicated. For example, a marker may include a toll, facility, or other indicator that provides for crossing a boundary, manages entering and/or exiting of a designated area, and/or the like. Some examples are parking structures, gated communities, research labs, campuses, countries (borders), court houses, etc. Areas may be designated for various reasons, such as security, traffic limitation, etc. One designated area may have one or more markers (e.g., one or more entrances/exits). Information of individuals passing a marker can be recorded, either manually by personnel or automatically by other one or more independent systems. Individuals entering and/or exiting different designated areas may be required to provide various personal identifiable information. A marker may include one or more lanes.

Passing: Any crossing of a marker. For example, a passing may include entering and/or exiting events related to a marker of a designated area. The passing can be made by an individual via a vehicle, on foot, etc. A passing can be made by one or more individuals. The one or more individuals may make a passing for various reasons, and sometimes the passing may be made by ways of log in, identification, security checking, background checking, etc. Passings can also be categorized based on individuals.

Co-Passings: Any passing of an individual (or other entity) that is in any way related to a passing of another individual (or entity). For example, if two individuals pass a marker in one car, their passings can be viewed as a co-passing by the system. The relationship of co-passings may be one of more remote in nature. As one example, co-passings may include two passings of two individuals happening in one designated area, happening within a certain period of time, happening at the same marker, happening in the same vehicle in totally different areas, etc. The relations of co-passings may be defined by a user.

Example System and Network Environment

FIG. 1 is a system diagram illustrating an example integrated system in an example operating environment 100, according to an embodiment of the present disclosure. In the example of FIG. 1, the operating environment 100 includes the system 120, data sources A 110a to N 110n, and user device 130. The system 120, the data sources A 110a to N 110n, and the user device 130 can communicate with each other using a network 102. In some embodiments, the system 120 can include one or more centralized databases. The operating environment 100 can allow users to input, edit, organize, and/or compute data in the system 120 via the user device 130. The system 120 can generate one or more interactive user interfaces displaying on the user device 130. The network 102 can be a local area network, a wide area network, a peer-to-peer network, radio frequency, Bluetooth, Wi-Fi, or any other type of communication network. In some embodiments, components within the computing environment 100 can communicate with each other through different types of networks at the same time.

Example Marker System

The system 120 can perform various functions in the operating environment 100, such as collecting data items associated with various individuals from the data sources A 110a to N 110n, storing and process data items for the individuals, transmitting the processed data items to the user device 130, generating and transmitting notices based on the processed data items to the user device 130 and/or the data source A 110a to N 110n, etc. The system 120 may be a part of one or more servers. The system 120 can include multiple engines performing the various functions. In the example of FIG. 1, the system 120 includes a data management engine 124, a passing analysis engine 126, a UI management engine 128, and a data store 122. The data store 122 can be a local data store. Alternatively, the data store 122 can be a remote data store connected to the system 120 via the network 102. In some embodiments, one or more engines can perform one or more of the various functions.

The data management engine 124 can communicate, exchange, or share data with other devices or systems, such as the data sources A 110a to N 110n, the user device 130, other data stores, etc. The data management engine 124 can collect data items associated with passings of individuals, reformat the data items into uniform format data items, and/or store the reformatted data items, process the reformatted data items to determine potential co-passings and transmit the processed reformatted data items to the user device 130, generating and transmitting notices to the data sources A 110a to N 110n, etc. The passing analysis engine 126 can compute the uniform format data items and determine co-passings based at least partly on search criteria provided by the user. Additionally, based at least on user inputs selecting another individual, the passing analysis engine 126 can update co-passings of the individual and the other individual. As the passing analysis engine 126 determines co-passings, it can retrieve data from one or more databases for the user. The UI management engine 128 can generate an interactive user interface for the user on the user device 130, where the interactive user interface can display passings of an individual and/or co-passings of two or more individuals in various formats, such as interactive bubble charts, interactive tables, interactive timelines, interactive bar charts, etc. The UI management engine 128 can also receive inputs from the user to search co-passings. Based at least partly on the received inputs, the passing analysis engine 126 can determine co-passings based at least partly on the input and the UI management engine 128 can advantageously in some embodiments update the interactive user interface on the user device 130 to display the passings. Additionally, the UI management engine 128 can also receive user inputs from the user to view the co-passings more interactively.

Example Data Management Engine

In the example of FIG. 1, the system 120 includes a data management engine 124. The data management engine 124 can communicate, exchange, or share data with other devices or systems, such as the data sources A 110a to N 110n, the user device 130, other data stores, etc. The data management engine 124 can collect data items associated with passings of individuals, reformat the data items into uniform format data items, and/or store the reformatted data items, process the reformatted data items to determine potential co-passings and transmit the processed reformatted data items to the user device 130, generating and transmitting notices to the data sources A 110*a* to N 110*n*, etc.

In some embodiments, the data management engine 124 can communicate, exchange, or share data with the other devices or systems constantly. For example, each time the data sources A 110*a* to N 110*n* have a data update, the data management engine 124 can receive the update automatically. The data management engine 124 can also communicate, exchange, or share data with the data sources A 110*a* to N 110*n* periodically upon a trigger event defined by the user. A trigger event may be an indication that a certain period of time has passed since the last update. A trigger event may be also a specific individual passing a certain marker.

The data management engine 124, advantageously in some embodiments, can only request relevant data from the data sources A 110*a* to N 110*n* as needed. For example, the user may wish to view passing data of one or more individuals. Upon the system 120 receives the user input from the user device 130, the data management engine 124 can first communicate with each of the other devices and systems asking for data items associated with the one or more individuals. The data management engine 124 can then collect data items associated with the one or more individuals.

The various data sources A 110*a* to N 110*n* may operate various different systems collecting different passing data items. In some instances, these systems may allow access through specific Application Programming Interfaces ("APIs"). Commonly, each API utilizes its own format in storing availability data items associated with a marker. Advantageously in some embodiments, the data management engine 124 can collect data items that are stored in a specific format in a specific API in the data source A 110*a* by forming API requests in the specific format. The API request may contain information required by the API. The data management engine 124 can then collect responses from the API, parse through the responses, and translate the responses into data items in a uniform format that the passing analysis engine 126 can compute. In collecting the passing data items of each marker, the data management engine 124 can form various requests for the various APIs, collect responses containing information from the APIs in the various data sources A 110*a* to N 110*n*. The data management engine 124 can store the collected information in the data store 122.

Additionally, the data management engine 124 can also parse through the collected responses and determine the data items to be translated into the uniform format. The uniform format data items can also include information associated with the API(s) and/or the data source(s) where the data items are collected from. As the responses collected from the APIs may contain information irrelevant to determining co-passings, advantageously in some embodiments, the data management engine 124 can determine the types of information needed. The data management engine 124 can compare the types of information needed with the data items in the responses collected and then translate the data items containing the types of information needed. In some embodiments, the data management engine can communicate with other systems if the data management engine 124 determines the data items collected are not comprehensive as needed, it may communicate with other systems the system 120 does not normally communicate with to collect required data. As an example, if passing data items the data management engine 124 collected does not include data of a photo of an individual, the data management engine 124 may communicate with social network systems and/or search engines to obtain data of a photo (e.g., the most recent photo) of the individual.

In some embodiments, the data management engine 124 can first translate the data items in the collected responses into the uniform format and then compare the uniform format data with the types of information needed. The data management engine 124 can then store the relevant information in the data store 122. The data management engine 124 can create an individual passing database stored in the data store 122. The individual passing database can store the uniform format data items translated from the collected information. Alternatively, the individual database can store the data items in the data stores 122 in their original formats. Advantageously in some embodiments, if the data sources A 110 and N 110*n* provide the data management engine 124 with data items in a single format, the data management engine 124 may choose not to translate the single format data items into the uniform format. The data management engine 124 can parse through the data and store the relevant data items in the individual passing database in the single format.

The individual passing database can store any information associated with the individual and his passing, such as a name, an ID (e.g., SSN), a date of birth, a gender, a photo, an event (e.g., social, personal, criminal, etc.), vehicle information, etc. The vehicle information can include any information of a vehicle by which an individual uses to pass a marker or an indication that the individual passes a marker on foot, such as a color of a vehicle, a model of vehicle, individuals related to the vehicle, etc.

In some embodiments, the data management engine 124 can communicate with the data sources A 110*a* to N 110*n* periodically in order to update the individual passing database. This can advantageously improve the efficiency, accuracy, and/or speed as it avoids multiple requests to the same API(s). The data management engine 124 may only need to collect updated information associated with passings that are not stored in the availability database. For example, upon receiving a new request to view passings for one or more individuals, the data management engine 124 can collect information associated with each individual. If currently there is information associated with one or more individuals stored in the individual passing database, the data management engine 124 can compare the newly collected information associated with the one or more individuals with the stored information in the individual passing database and store only the updated information in the individual passing database. In some embodiments, the data management engine 124 can store the collected information in the data store 122 temporarily. The data management engine 124 may delete the stored information each time the system 120 receive a user input indicating the user has finished viewing passing information. Upon receiving a new request, the data management engine 124 can repeat the process.

The data management engine 124 can also create a marker database. As the passing analysis engine 126 determines one or more co-passings, the data management engine 124 can store the co-passings in the marker database. The marker database can also include any other information related to passings of a marker, such as individuals passing the marker, a related marker (e.g., another marker of the same and/or related designated area), a lane an individual in which an individual passing the marker, a vehicle, etc. The data management engine 124 can also map data items in the marker database with data items in other databases, such as the individual passing database. The data management engine 124 can also store in the marker database other information, such as user inputs regarding co-passings with other individuals, rankings and/or scores of each of the other individuals, etc. The data management engine can also transmit the notices the passing analysis engine 126 generates to the user device 130 and/or the data sources A 110a to N 110n. In some embodiments, the data management engine 124 can retrieve the API information stored in the individual passing database, and generate the notices in the data formats the APIs recognize. The data management engine 124 can then transmit the notices to the data sources A 110a to N 110n and/or the user device 130. The notices can be any information related to the passing of the individual.

Example Passing Analysis Engine

In the example of FIG. 1, the system 120 includes a passing analysis engine 126. The passing analysis engine 126 can compute the uniform format data items and determine co-passings based at least partly on search criteria provided by the user. Additionally, based at least on user inputs selecting another individual, the passing analysis engine 126 can update co-passings of the individual and the other individual. As the passing analysis engine 126 determines co-passings, it can retrieve data from the individual passing database and/or the marker database to provide more information for the user.

Upon receiving a request to view passing information related to an individual or a marker, the passing analysis engine 126 can retrieve information related to one or more passing instances related to the individual or the marker from the data store 122. The passing analysis engine 126 can categorize the information it retrieves from the data store 122 into different groups for easy access. In some embodiments, such categorization may have been performed by the data management engine 124 as it stores passing information in the individual passing database and/or marker database. The passing analysis engine 126 can communicate with the UI management engine to generate interface data to display such information in an interactive user interface on the user device 130.

Additionally, upon receiving searching criteria from user to search for one or more co-passings related to the individual, the passing analysis engine 126 can determine one or more other individuals whose passings are related to the instances of the passings of the individual. The search criteria can include a minimal and/or maximum number of co-passings, a minimal and/or maximum number of independent passings, a minimal and/or maximum time interval, whether to include related vehicles, whether to include related markers, etc.

The minimal or maximum number of co-passings may indicate a minimal or maximum number of the passings of the one or more markers that are related to the individual in a certain way. The relationship may be defined by the user and/or pre-defined by the system. As one example, co-passings may include individuals from a single household. As another example, co-passings may include individuals passing a specific marker, and/or a same lane of the same marker in the same day. The user may define co-passings at any time to better analyze passings of individuals. In some embodiments, the system 120 may pre-define co-passings as individuals passing the same marker in the same day. The system 120 may then provide the user, via the UI management engine 128, with a user interface to define co-passings.

The minimal or maximum independent passings may indicate a minimal or maximum number of the passings that are not related to the individual in any way. The minimal or maximum time interval may indicate a minimal or maximum period of time could lapse between two co-passings. Whether to include related vehicles may indicate whether the other one or more individuals used one or more vehicles related to the individual. The related vehicles may be vehicles used by the individual, vehicles registered under the individual's name, vehicles used by a person related to the individual, etc. The related vehicle may be defined by the user and/or pre-defined by the user. Whether to include related markers may indicate whether one or more markers related to the markers the individual passed are included. Such relationship may be defined by the user and/or pre-defined by the user. As one example, markers are related if they are associated with the same designated area. As another example, if two or more designated areas are associated with each other, such as various campuses of a university, markers associated with the designated areas are related.

Based at least partly on the search criteria, the analysis engine 126 can compute data items in the data store 122 and determine one or more other individuals with passings related to the passings of the first individual. If there is one other individual with passings related to the passings of the first individual, the passing analysis engine 126 can communicate with the UI management engine 128 to update the interactive user interface displaying the passing of the one other individuals, such as in the interactive bubble chart, interactive bar chart, interactive table, and/or interactive timeline. In some embodiments, if there are more than one other individual with passings related to the passings of the first individual, the passing analysis engine 126 can weight and/or rank, based at least partly on one or more predefined decision rules and/or user defined rules, the more than one other individual. The decision rules can include: the time of co-passings based at least on the search criteria, a quantity of each of the more than one other individual passing a certain marker, a quantity of each of the more than one other individual entering and/or exiting the designated area. The system 120 can then update the interactive user interface to display the more than one other individuals based at least partly on the ranking. As the user selects one of the more than one other individuals, the passing analysis engine 126 can communicate with the UI management engine 128 to update the interactive user interface to display the passing of the one of the more than one other individuals, such as in the interactive bubble chart, interactive bar chart, interactive table, and/or interactive timeline.

In some embodiments, the passing analysis engine 126 may further include a machine learning module. The machine learning module may parse through the data items stored in the individual passing database and/or marker database. The machine learning module can advantageously map the multiple data items in the individual passing database and/or the marker database. The machine learning module can first conduct the pre-computation mappings based on the system pre-defined mapping rules. The mapping rules may be any relationships between individuals, markers, and/or vehicles. As user interacts with the system 120, the machine learning module can, based at least on the user interactions, update the mapping rules. Additionally, based at least on the updates in the mapping rules, the machine learning module may also advantageously make one or more predictions of a specific user's preference of search criteria.

For example, if one user frequently searches co-passings of two individuals passing the same marker in related vehicles within a thirty-minute interval, the machine learning module may map individuals passing a same marker in related vehicles within a thirty minute interval in the individual passing database and/or marker database. As such user makes a further interaction with the system 120 asking for individual A's passing information and requests co-passings of another individual passing the same marker in related vehicles within a thirty-minute interval, the machine learning can search the stored mappings and determine one or more other individuals that meet the search criteria. As another example, if a user frequently searches co-passings using two or more sets of search criteria, the machine learning module can conduct two or more mappings for each individual in the individual passing and/or marker database. This way, advantageously, as the user requests to view co-passings information using the same two or more sets of search criteria, the system can provide the requested information more efficiently as the system can simply retrieve the mapping in the data store 122 without conducting further computation and/or searching in the data store 122.

In some embodiments, based on the pre-computation mappings and/or the events stored in the individual passing database, the machine learning module can determine one or more possible relations between individuals or markers. The machine learning module can study and/or analyze one or more patterns of an individual's passings, such as time, dates, specific markers, etc. The machine learning module can determine the relationships between the events and tag those of high importance. As one example, if one individual passes a marker at a time out of pattern, the machine learning module can flag the individual. As a related individual is trying to pass a related marker, the machine learning module can generate a notice and the system 120 can transmit the notice to the data sources A 110a to N 110n.

Example UI Management Engine

The system 120, in the example of FIG. 1, includes a UI management engine 128. The UI management engine 128 can generate an interactive user interface for the user on the user device 130, where the interactive user interface can display the passing, co-passing, and/or marker information on the user device 130. The UI management engine 128 can also receive inputs from the user to request co-passings information. Based at least on the received inputs, the system 120 can instruct the passing analysis engine 126 to determine co-passings and the UI management engine 128 can advantageously update the interactive user interface on the user device 130 displaying the co-passing information.

Figure 4:
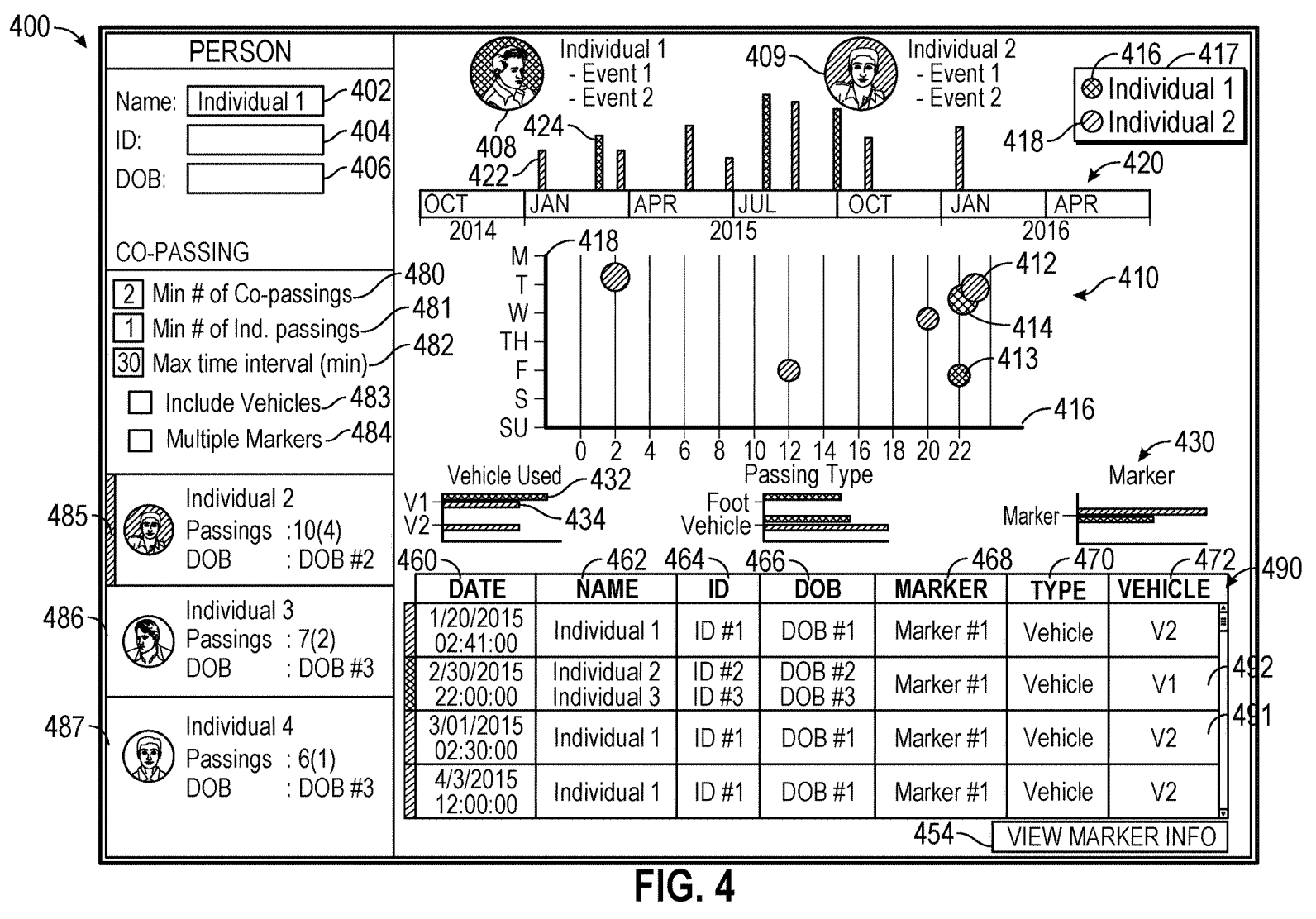

The UI management engine 128, in some embodiments, may generate one or more portions on the interactive user interface for receiving, displaying, and/or updating search criteria, passing information, and/or any other information. In the examples of FIG. 4, the UI management engine 128 can generate the following portions of the interactive user interface: one for receiving search criteria from the user, one for an interactive bubble chart displaying passing information, one for displaying one or more other individuals related to the individual based at least partly on the search criteria, one for receiving user inputs, etc. In other examples, the UI management engine 128 can generate and/or display more or fewer portions for displaying more or less passing information and/or receiving inputs from users.

The UI management engine 128 can, based on user inputs, add, delete, update, and/or edit one or more user interface elements on the interactive user interface. For example, the UI management engine 128 can generate a UI element for adding, deleting, and/or updating the search criteria. The user, using the UI element, can add one or more UI elements to customize the search criteria. The added UI elements may have different formats, such as calendar, dropdown box, etc.

More details of the UI management engine 128 will be discussed with references to FIG. 4 and FIG. 5.

Additional Example Implementations of the System

In an implementation the system 120 (or one or more aspects of the system 120) may comprise, or be implemented in, a "virtual computing environment". As used herein, the term "virtual computing environment" should be construed broadly to include, for example, computer readable program instructions executed by one or more processors (e.g., as described below in the example of FIG. 6) to implement one or more aspects of the modules and/or functionality described herein. Further, in this implementation, one or more modules/engines/etc. (e.g., data management engine 124, passing analysis engine 126, and/or UI management engine 128) of the system 120 may be understood as comprising one or more rules engines of the virtual computing environment that, in response to inputs received by the virtual computing environment, execute rules and/or other program instructions to modify operation of the virtual computing environment. For example, a request received from the user device(s) 130 may be understood as modifying operation of the virtual computing environment to cause the data management engine 124 to gather data associated with the request, the passing analysis engine 126 to automatically generate scheduled, and the UI management engine 128 to generate interactive user interfaces. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the data management engine 124 and/or responses received and analyzed via the UI management engine 128 and/or the passing analysis engine 126. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system 120 as a virtual computing environment may advantageously enable executing different aspects or modules of the system on different computing devices or processors, which may increase the scalability of the system. Implementing one or more aspects of the system 120 as a virtual computing environment may further advantageously enable sandboxing various aspects, data, or modules of the system from one another, which may increase security of the system by preventing, e.g., malicious intrusion into the system from spreading. Implementing one or more aspects of the system 120 as a virtual computing environment may further advantageously enable parallel execution of various aspects or modules of the system, which may increase the scalability of the system. Implementing one or more aspects of the system 120 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Example Passing Analysis Process

Figure 2:
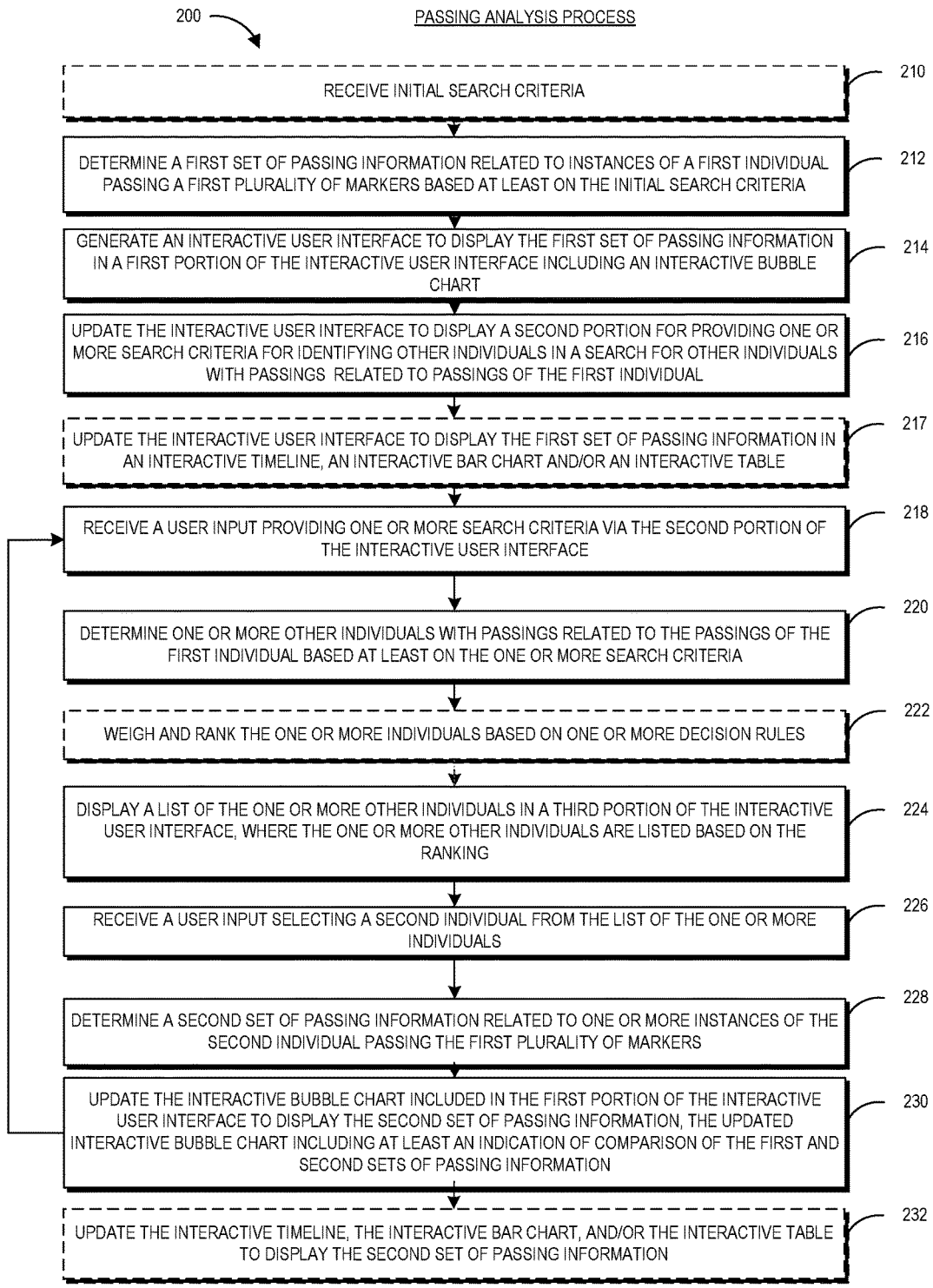
FIG. 2 is a flow chart illustrating an example process of passing analysis, according to an embodiment of the present disclosure.

FIG. 2 is a flow chart illustrating an example passing analysis process according to an embodiment of the present disclosure. In various embodiments, fewer blocks or additional blocks may be included in the process of FIG. 2, or various blocks may be performed in an order different from that shown in the figure. In various implementations, the block of FIG. 2 may be performed serially and/or concurrently, and may be performed multiple times simultaneously. Further, one or more blocks in the figure may be performed by various components of the system, for example, the passing analysis engine 126 (described above in reference to FIG. 1).

At optional block 210, the system 120 may receive initial search criteria. The initial search criteria may be entered by the user in an interactive user interface described later with reference to block 214. The initial search criteria may include one or more of the following: a name, an ID, a date of birth, etc. The initial search criteria, in some embodiment, may be used to determine one or more individuals by the system 120. The system 120 can display the list of the one or more individuals to the user and the user can choose a first individual whose passing information the user wishes to view.

At block 212, the system 120 can determine a set of passing information of the first individual the user wishes to view. The set of passing information may include passing information related to instances of the individual passing one or more markers. As the system 120 receives the initial search criteria from the user input, the passing analysis engine 126 can retrieve data associated with the passing information related to the instances of the individual passing the one or more markers in the individual passing database.

At block 214, the system 120 can generate an interactive user interface on the user device 130. The interactive user interface can include an interactive bubble chart in a first portion. The set of passing information of the instances related to the first individual can be displayed in the interactive bubble chart. The interactive bubble chart may be used to show a pattern in the first set of passing information. As an example, the Y axis of the interactive bubble chart indicates one or more days of the week and the X axis of the interactive bubble chart indicates one or more time periods within a day. A bubble at an intersection of the X axis and the Y axis indicates a quantity of the first individual passing the one or more markers. The size of the bubble may indicate the quantity.

At block 216, the system 120 can update the interactive user interface to display one or more user elements in a second portion. The one or more interactive user elements can indicate one or more search criteria for identifying other individuals in a search for passings related to the passings of the first individual. As described with reference to the passing analysis engine 126, the search criteria can include a minimal and/or maximum number of co-passings, a minimal and/or maximum number of independent passings, a minimal and/or maximum time interval, whether to include related vehicles, whether to include related markers, etc. In some embodiments, the system 120 can provide the user in the second portion for the user to define, add, delete, and/or update the one or more search criteria.

At optional 217, the system 120 can update the interactive user interface to include one or more additional portions. The one or more additional portions may include one or more interactive user interface elements for displaying the first set of passing information. For example, the system 120 can update the interactive user interface to include an interactive timeline, an interactive bar chart, and/or an interactive table. The one or more interactive user interface elements can be used to display the first set of passing information of instances of the first individual. In some embodiments, the system 120 can provide the user in the second portion a user interface element for the user to define, add, delete, and/or update the one or more user interface elements for search criteria.

At block 218, the system 120 can receive one or more search criteria via the second portion of the interactive user interface. The search criteria can be input by the user. As described with reference to FIG. 1, the search criteria entered by the user can be used by the passing analysis engine 126 to determine one or more patterns of the user's analysis. The one or more patterns can be used by the passing analysis engine 126 to conduct one or more pre-computation mappings. The pre-computation mappings can categorize information in the individual passing database and/or marker databases based at least partly on the one or more patterns. This can advantageously improve the computation speed of the system 120 and/or prove the efficiency.

At block 220, the system 120 can determine one or more other individuals with passings related to the passings of the first individual based at least on the one or more search criteria. The system 120 can search the individual passing database and/or marker database to determine the one or more individuals. Advantageously in some embodiments, the system 120 can retrieve the pre-computation mappings of the user if the one or more search criteria match the one or more patterns. The system 120 can then update the interactive user interface to display the one or more individuals. Additionally, before updating the interactive user interface, the system 120 can communicate with the data sources A 110*a* to N 110*n* to receive updates and update the individual passing database and/or marker database accordingly. Based on the one or more search criteria, the system 120 can refine and/or update the one or more patterns of the pre-computation mappings.

At optional block 222, the system 120 can weigh and rank the one or more other individuals based on one or more decision rules. The decisions rules can be pre-defined by system 120 and/or by the user. The decision rules may include a quantity of the co-passings, a time of co-passings based at least of the search criteria, a quantity of each of the more than one other individual passing a certain marker, a quantity of each of the more than one other individual entering and/or exiting the designated area, etc. Advantageously, the one or more patterns can include the user's preference of analysis of co-passings. For example, if a user constantly views co-passings of two individuals with similar events (such as, same department), such preference may be taken into consideration when determining the one or more patterns of the user. The machine learning module can then update the one or more pre-computation mappings to improve efficiency of the system 120.

At block 224, the system 120 can update the interactive user interface to display the list of the one or more other individuals in a third portion. In some embodiments, the list of the one or more other individuals may be displayed according to the ranking determined at optional block 222. The interactive user interface, in the third portion, may include one or more reasons of the rankings.

At block 226, the system 120 can receive a user input selecting a second individual from the list of the one or more individuals. As the system receives such selection, the system 120 can determine, at block 228, a second set of passing information related to one or more instances of the second individuals passing the markers in the individual passing database and/or marker database. Advantageously in some embodiment, as the system 120 retrieves the pre-computation mappings, the system 120 can retrieves the relevant passing information as well. Alternatively, the user can select a third individual from the list (not indicated in FIG. 3), the system can update the interactive user interface accordingly.

At block 230, the system 120 can update the interactive user interface to display the second set of passing information in the interactive bubble chart. The second set of passing information may be displayed in the interactive bubble chart using a different format than the first set of passing information, such as a different color, different shades, etc. At optional block 232, the system 120 can update the interactive user interface to display the second set of passing information in the interactive timeline, bar chart and/or table. As in the interactive bubble chart, the second set of passing information may be displayed in the interactive timeline, bar chart and/or table in a different format. The system 120 can optionally receive another one or more search criteria from the user to find another individual as the passing analysis process loops back to the block 218.

Advantageously in some embodiments, as the user interacts with one portion of the interactive user interface, the system 120 can update other portions to indicate such interactions. For example, if the user selects a bubble in the interactive bubble chart, the system 120 can update the interactive timeline, interactive bar chart and/or interactive table to highlight only passing information of the selected bubble in the interactive bubble chart. Due to the pre-computation mappings and/or patterns, the system 120 can provide more efficient passing data processing to the user. The machine learning module of the system 120 can also help the user to better understand the passing information by sending notices.

Example Marker Analysis Process

Figure 3:
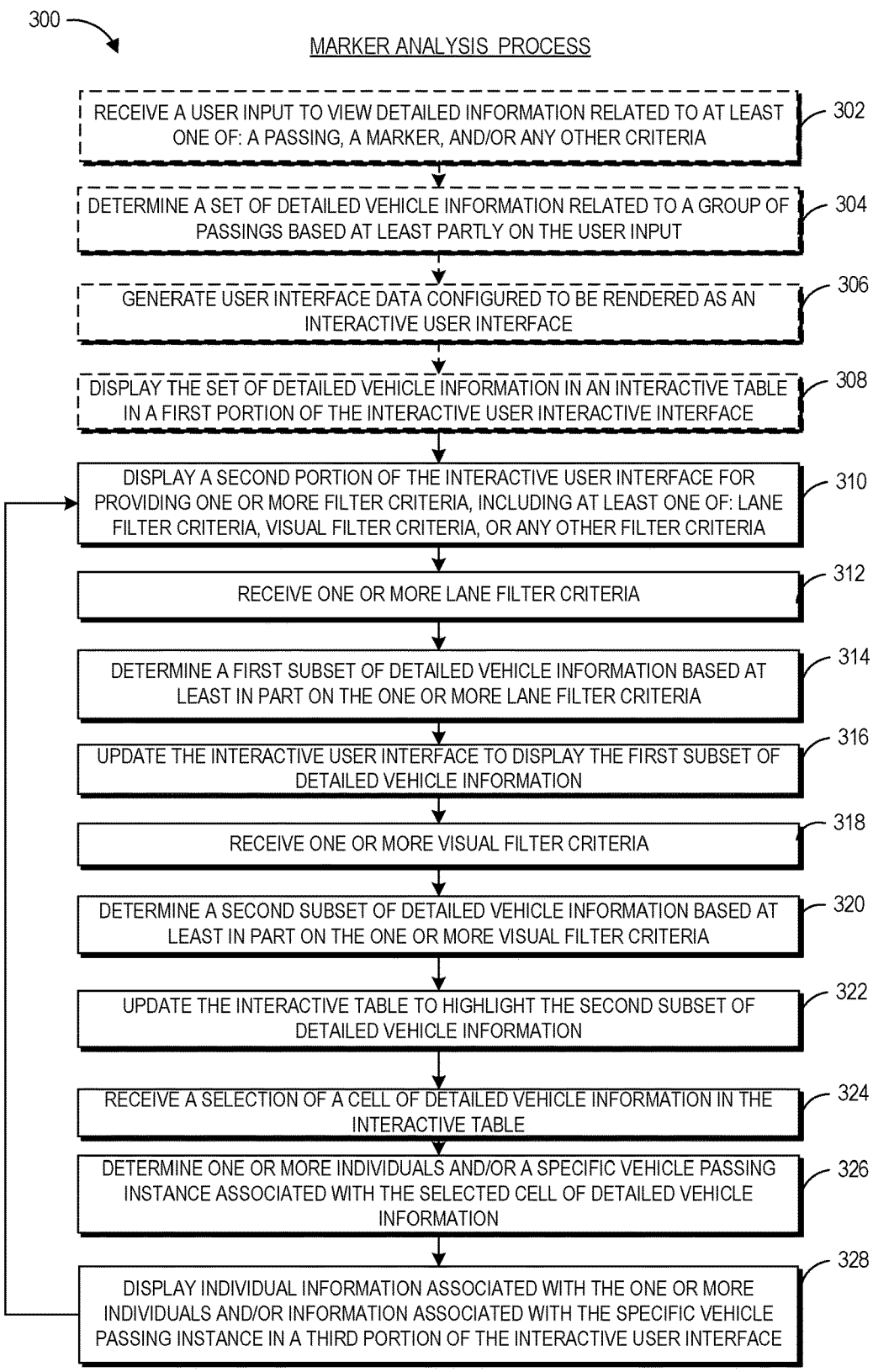
FIG. 3 is a flow chart illustrating an example process of marker analysis, according to an embodiment of the present disclosure.

FIG. 3 is a flow chart illustrating an example process 300 of marker analysis, according to an embodiment of the present disclosure. In various embodiments, fewer blocks or additional blocks may be included in the process of FIG. 3, or various blocks may be performed in an order different from that shown in the figure. In various implementations, the block of FIG. 3 may be performed serially and/or concurrently, and may be performed multiple times simultaneously. Further, one or more blocks in the figure may be performed by various components of the system 120, for example, the passing analysis engine 126 (described above in reference to FIG. 1).

At optional block 302, the system 120 receives a user input to view detailed information associated with a specific marker. The input may be a passing, a marker and/or any other criteria. Based at least partly on the user input, the system 120 can determine at optional block 304 a set of detailed vehicle information related to a group of passings in the individual passing database and/or marker database. In some embodiments, the user can request to view the detailed vehicle information in an interactive user table as discussed with reference to FIG. 2. The system, at optional block 306, can generate an interactive user interface to display the set of detailed vehicle information. Alternatively, the system 120 can update the interactive user interface for the user to enter one or more criteria to view detailed vehicle information related to a specific marker as later described in details with reference to FIG. 5.

At optional block 310, the system 120 can update the interactive user interface to display the set of detailed vehicle information in an interactive table in a first portion. In the interactive table, the rows correspond to different time periods of a specific day and the columns indicate one or more lanes of the specific marker. Each cell may include detailed information of a vehicle of the passing, such as a photo of the vehicle, a color of the vehicle, a model of the vehicle, a time of the vehicle passing the marker, etc. In some embodiments, the system 120 may update the interactive table to display the detailed information in different formats. As one example, the system 120 can update the interactive table to show an actual photo of the vehicle, including the specific color and model. Such display can help the user to better visually analyze of the passing.

At block 310, the system can update the interactive user interface to display a second portion for providing one or more filter criteria. The filter criteria can include lane filter criteria and/or visual filter criteria. The lane filter criteria may include a marker, a date, a time, etc. The system 120 can provide the user options to add, edit, and/or delete the lane filter criteria. The visual filter criteria may include a color of a vehicle, a model of a vehicle, a VIN number of a vehicle, a license plate of a vehicle, etc. The system 120 can provide the user options to add, edit, and/or delete the visual filter criteria on the interactive user interface.

At block 312, the system 120 receives one or more lane filter criteria from the use. As the system 120 receives the one or more lane filter criteria, the system 120 can determine at block 314 a first subset of detailed vehicle information based at least partly on the lane filter criteria. The system 120 can retrieve the first subset of detailed vehicle information from the individual passing database and/or the marker database.

At block 316, the system 120 can update the interactive user interface to display the first subset of detailed vehicle information in the interactive table. The rows and columns of the interactive tables can be updated. Each cell can show one or more sets of detailed vehicle information meeting the lane filter criteria.

At block 318, the system 120 can receive one or more visual filter criteria. Based at least partly on the one or more visual filter criteria, the system 120 can determine a second subset of detailed vehicle information at block 320. Advantageously in some embodiments, the system can group passings with similar vehicle visual characteristics together associated with a marker in the marker database. As one example, the system 120 can group passings of black vehicles associated with a marker. As another example, the system 120 can group passings of 2011 black Model A vehicles together. As the system 120 receives the one or more visual filter criteria, the system 120 can then determine the second subset of detailed vehicle information in the related group. This way, when dealing with a huge number of passing data, the system 120 can provide an efficient way to process data.

As the system 120 determines the second subset, the system 120 at block 322 can update the interactive user interface to highlight the second subset of detailed vehicle information. The highlighting can be done by the system 120 in various formats. As one example, if the user wishes to view only red vehicles, the system 120 can update the interactive table to highlight the set of detailed vehicle information of red vehicles in red boxes as described in details later with reference to FIG. 5.

At block 322, the system 120 can receive a user selection of a set of detailed vehicle information. The system 120 can then determine one or more individuals associated with the vehicle in the selected cell at block 326. The system 120 can retrieve detailed individual information associated with the one or more individuals in the individual passing database and/or marker database. The system 120 can then update the interactive user interface to display the detailed individual information associated with the one or more individuals. The detailed individual information may include a photo, a name, an ID, etc. The user can further interact with the system 120 to request a passing photo which was taken as the individual passed the marker.

Advantageously in some embodiments, as the system 120 determines the first subset and the second subset of detailed vehicle information, the system 120 can automatically group relevant detailed individual information as at block 320. The system 120 can provide an efficient way to process data. The system 120 can further provide the user with more comprehensive ways to view detailed vehicle and/or individual information related to a marker.

Example User Interfaces

Figure 5:
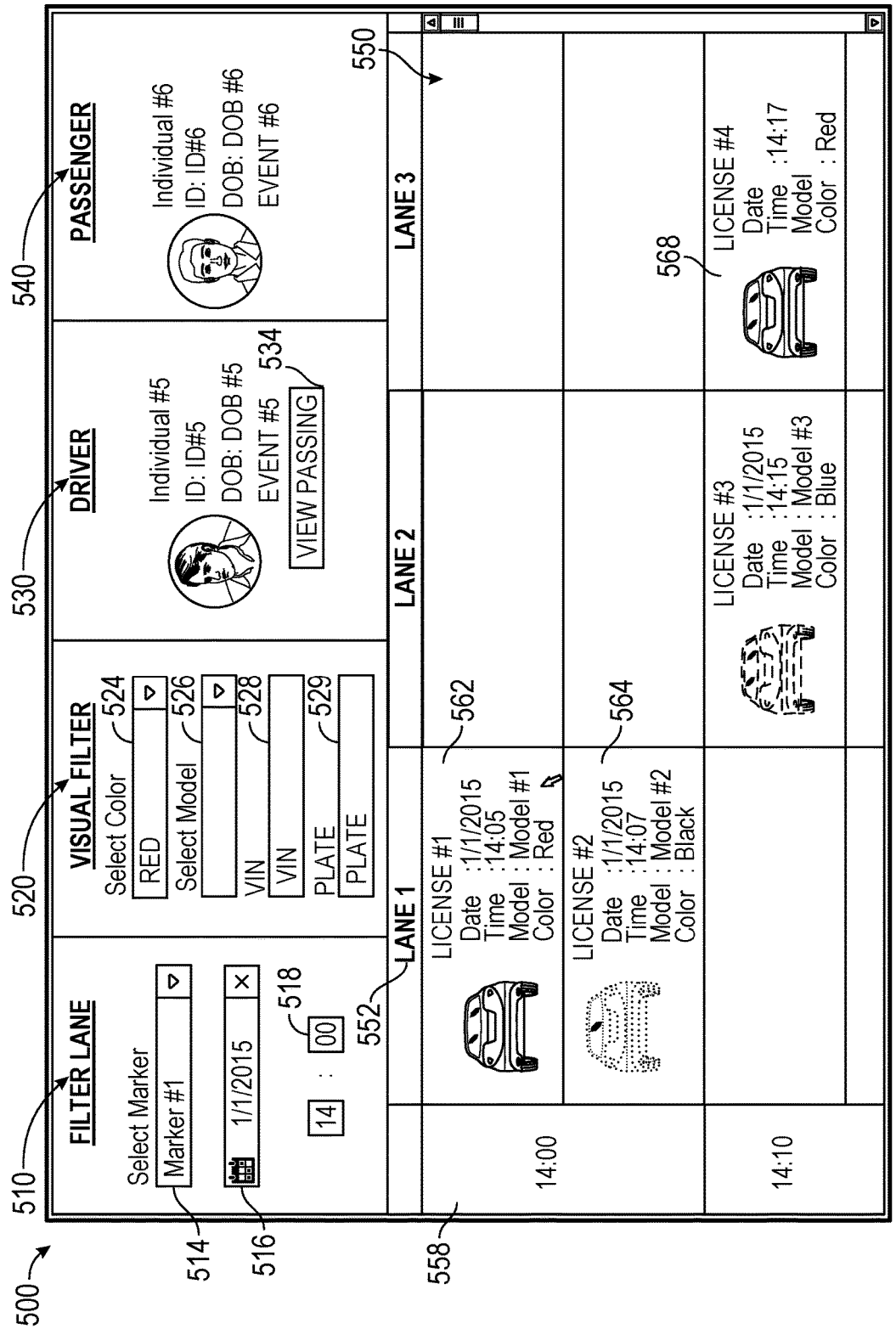

FIG. 4 and FIG. 5 illustrate example interactive user interfaces displaying passing and/or co-passing information to a user, according to an embodiment, in which search criteria is collected, analyzed and/or computed and, based on the analysis and/or computation, co-passing information is automatically determined and presented to a user.

In the example of FIG. 4, the system 120 can generate an interactive user interface 400 on the user device 130 for displaying passing and/or co-passing information. The user can input one or more initial search criteria in user interface elements provided by the system 120. For example, the user can enter a name in a textbox 402, an ID in a textbox 404, and/or a date of birth in a textbox 406. As the user makes his input, the system 120 can determine a first individual, Individual 1, whose passing information the user wishes to view. The system 120 can retrieve data items associated passing information related to Individual 1 in the individual passing database and/or the marker database. In some embodiments, the system 120 can update the interactive user interface 400 to allow the user to add, edit, and/or delete one or more user interface elements for providing more or fewer initial search criteria. In some embodiments, one or more other applications can provide the system 120 with one or more initial search criteria. The one or more other applications can be text systems, call systems, and/or internet-based applications. As an example, the user can text the system 120 one or more initial search criteria and the system 120 can parse through the text message and determine the one or more initial search criteria inputted by the user.

The system 120 can then update the interactive user interface 400 displaying the passing information of Individual 1 in various interactive user interface element. As an example, the system 120 can update the interactive user interface to display personal information of Individual 1. In the example of FIG. 4, a photo of Individual 1 is displayed via a user interface element 408. The name of Individual 1, Event #1, and Event #2 are displayed next to the photo. In some embodiments, as the user click on the name of Individual 1 and/or the photo, the system 120 can generate a pop-up user interface to display detailed individual information related to Individual 1.

The system 120 can also display the passing information related to Individual 1 in various interactive user interface elements, such as an interactive time bar 420, an interactive bubble chart 410, an interactive bar chart 430, and an interactive table 490. In the interactive bubble chart 410, the X-axis 416 indicates one or more time periods within a day and the Y-axis indicates days within a week. The passing information related to Individual 1 is displayed as various bubbles in the chart. Each bubble indicates a quantity of passings related to Individual 1. As an example, bubble 414 may indicate a quantity of passings related to Individual 1 happening from 21:00 to 23:00 on Tuesdays. The size of a bubble may indicate the quantity of passings as shown in the interactive bubble chart 410. As one example, bubble 413 is smaller than bubble 414; the quantity of the passings related to Individual 1 from 21:00 to 23:00 on Tuesdays is higher than the quantity of the passings related to Individual 1 from 21:00 to 23:00 on Fridays. In some embodiments, the system 120 may indicate the quantity of passings within the bubble. Additionally, if the user clicks on the bubble 414, the system 120 can generate a pop-up user interface to display detailed information of the passings related to the bubble 414, such as detailed vehicle and/or individual information of such passing. The system 120 can provide the user with a user interface element to edit and/or define the interactive bubble chart, such as to change the format, the X-axis indications, the Y-axis indications, etc.

In the interactive timeline 420, the X-axis may indicate a month of a year. In the example of FIG. 4, the X-axis in the interactive time line indicates a quarter of a year. Each bar in the interactive timeline may indicate the number of passings related to Individual 1 in the time period of the X-axis. For example, bar 424 indicates a number of passing related to Individual 1 around March, 2015. As bubbles in the interactive bubble chart, as the user clicks on a bar in the interactive timeline, the system 120 can generate a pop-up user interface displaying more detailed vehicle and/or individual information of the passings. The system 120 can provide the user with a user interface element to edit and/or define the interactive bar chart.

In the example of FIG. 4, there are three interactive bar charts displaying vehicle used information, passing type information, marker information. The Y-axis of the vehicle used information table indicates one or more vehicles Individual used the passings of Individual 1 while the X-axis indicates a number of the one or more vehicles used. The vehicle information may be display in models, license plates, and so on. The Y-axis of the passing type table indicates whether the user used one or more vehicle or walked the passings of Individual 1 while the X-axis indicates a number of passing type. The Y-axis of the marker table indicates one or more markers related to the passings of Individual 1 while the X-axis indicates a number of passing the one or more marker. As bubbles in the interactive bubble chart, as the user clicks on a bar in the interactive bar chart, the system 120 can generate a pop-up user interface displaying more detailed vehicle and/or individual information of the passings. The system 120 can provide the user means to edit and/or define the interactive bar chart.

The system 120 can also generate an interactive table 490 displaying the passing information related to Individual 1. In the example of FIG. 4, column 460 indicates a date of a passing, column 462 indicates one or more individuals associated with the passing, column 464 indicates one or more IDs of the one or more individuals, column 466 indicates one or more dates of birth of the one or more individuals, column 468 indicates one or more markers associated with the passing, column 470 indicates a passing type, and column 472 indicates a vehicle associated with passing. For example, row 491 indicates that Individual 1 passed Marker #1 in Vehicle V2 at 2:30:00 on Mar. 1, 2015 and Individual 1's ID is ID #1 and Individual's date of birth is DOB#1. As more than one individual may involve in a passing, the interactive table 490 may be updated to indicate the more than one individual as shown in row 492. As bubbles in the interactive bubble chart, as the user clicks a cell of the interactive table, the system 120 can generate a pop-up user interface displaying more detailed vehicle and/ or individual information of the passings associated with the cell. The system 120 can provide the user with a user interface element to edit and/or define the interactive table, such as adding more columns, changing the order of the column, etc. Additionally, as the user selects a cell of the interactive table 490, the user can view detailed vehicle information by clicking on a button 454. The system 120 can then generate a new interactive user interface displaying marker specific information as described later with reference to FIG. 5.

In the example of FIG. 4, the user can enter one or more search criteria in search for one or more other individuals with passings related to the passings of the first individual. For example, the user can enter a minimal number of co-passings via a user interface element 480, enter a minimal number of independent passing via a user interface element 481, enter a maximum time interval via a user interface element 482, enter whether to include related vehicles via a user interface element 483, and/or enter whether to include multiple related markers via a user interface element 484. The system 120 can provide the user with a user interface element to add, edit, and/or delete the one or more search criteria.

As the user enters the search criteria, the system 120 can determine one or more other individuals that meet the search criteria in the individual passing database and/or marker database. Advantageously, as discussed with reference to FIG. 2, the system 120 can improve data processing efficiency by accessing patterns and/or pre-computation mappings. In the example of FIG. 4, the user enters the following search criteria: a minimal number of two co-passings, a minimal number of one independent passings and maximum time of thirty minute interval. The system 120 determines three other individuals meeting the search criteria: Individual 2, Individual 3, and Individual 4. The system 120 can update the interactive user interface 400 to include a list of the other individuals. As the system 120 determines the three other individuals, the system 120 can weigh and rank the three other individuals and can display the list according to the ranking. As shown in boxes 485, 486, and 487, Individual 2 is listed on the top of the list as he has 10 passings with 4 co-passings related to the passings of Individual 1, Individual 3 is listed on the second of the list as he has 7 passings with 2 co-passings while Individual 4 is listed on the bottom of the list as he has 6 passing with 2 co-passings. They are listed on the interactive user interface 400 based on the number of their passing and co-passings As the user moves its cursor or clicks the boxes 485, 486, or 487, the system 120 can generate a pop-up user interface to display more detailed information of the passings related to Individual 2, Individual 3, or Individual 4. As the user selects Individual 1, the system 120 can update the interactive user interface 400 to display the passing information related to Individual 2 in the interactive bubble chart, the interactive timeline, the interactive bar chart and/or the interactive table. The system 120 can also update the interactive user interface 400 to include personal information related to Individual 2, such as a photo 409 of Individual 2, Individual 2's related events and any other individual information associated with Individual 2.

In a box 417, different formats may be shown for various individuals by the system 120. As shown in FIG. 4, the passing information related to Individual 1 is shown in a format in a user interface element 416 while the passing information related to Individual 2 is shown in a format in a user interface element 417. The different formats may be different colors, different lines, different shades, etc. Using the different formats, the system 120 can advantageously offer the user a clear and interactive way of viewing a comparison of the passing information associated with Individual 1 and Individual 2. One example is the bubble 414 and a bubble 412 in the interactive bubble chart 410. Other examples are bar 432 and bar 434 in the interactive bar chart 430, bar 422 and bar 424 in the interactive timeline 420, the row 491 and the row 492 in the interactive table.

In the example of FIG. 4, the user is viewing co-passing information related to Individual 1 and Individual 2. In some embodiments, the user can select yet another individual, for example, Individual 3, to view the co-passing information related to Individual 1, Individual 2, and Individual 3 in different formats. Advantageously, by efficiently processing data in the individual passing database and/or marker database, the system 120 can efficiently retrieve relevant passing and/or co-passing information based at least partly on the user input. The system 120 can also provide a more interactive and detailed way for the user to view such information.

As shown in FIG. 5. The system 120 can generate another interactive user interface 500 to display detailed vehicle information related to a marker. As discussed with reference to FIG. 4, the system 120 can generate the interactive user interface 500 in response to a user input to view detailed vehicle information associated with a specific marker.

The system 120 can generate an interactive table 550 on the interactive user interface 500 to display detailed vehicle information related to the marker. Rows of the interactive table 550 indicate one or more time periods on a specific day while columns of the interactive table 550 indicate a lane of the marker. Each cell indicates a set of detailed vehicle information related to a vehicle passing the marker using the corresponding lane in the corresponding time period. For example, in box 562 and box 564, the system 120 display two sets of detailed vehicle information related to two vehicles passing the marker using Lane 1 from 14:00 to 14:10. The detailed vehicle information in the interactive table may indicate information related to the vehicle: a license plate number, a date, a time of passing, a model, a color, a photo, etc.

In box 510, the user can input one or more lane filter criteria to filter the detailed vehicle information listed in the interactive user table 550: the user can select a marker via a user interface element 514, select a date via a user interface element 516, select a time via a user interface element 518, etc. The system may provide a user interface element for the user to add, delete, and/or edit one or more lane filter criteria. As the user inputs the one or more lane filter criteria, the system 120 can update the interactive table 550 to display only the detailed vehicle information that satisfies the one or more lane filter criteria.

In box 520, the user can input one or more visual filter criteria to filter the detailed vehicle information listed in the interactive user table 550: the user can select a vehicle color via a user interface element 524, a vehicle model via a user interface element 526, a VIN number via a user interface element 528, a license plate number via a user interface element 529. The system may also provide the user with a user interface element to add, delete, and/or edit one or more visual filter criteria. As the user inputs the one or more visual filter criteria, the system 120 can update the interactive table 550 to highlight the detailed vehicle information that satisfies the one or more visual criteria. The color of the highlighting in some embodiments may correspond to the color filter criterion. For example, if the user wishes to view detailed vehicle information related to red vehicles, the system 120 can update the interactive table 550 to highlight the cell 562 and cell 568 in red boxes.

Additionally, as the user selects a cell in the interactive table 550, the system 120 can highlight the cell and determines one or more individuals related to the cell. For example, if the user selects the cell 562, the system 120 can determines Individual 5 as the driver and Individual 6 as a passenger by accessing the individual passing database and/or the marker database and/or search individual information related to the specific marker, time period, vehicle, and as so on. In the box 530, the system 120 can display detailed individual information related to a driver, Individual 5, such as a photo, an ID, a date of birth and/or related events. In the box 540, the system 120 can display detailed individual information related to a passenger, Individual 6, such as a photo, an ID, a date of birth and/or related events. Additionally, the user can view a passing photo of Individual 1 by clicking a button 534, and the system 120 can generate a pop-up user interface to display a photo of Individual 5 and Individual 6 passing the Marker 1 at 14:05 on 1/1/2015 in a red model #1 vehicle with a license plate number "License #1".

The user may also wish to view passing information related to the driver, Individual 5. The user can click the photo or any other information in the box 530, the system can display the passing information related to Individual 1 on the interactive user interface 400 as described with reference to FIG. 4. Advantageously, by efficiently processing data in the individual passing database and/or marker database, the system 120 can efficiently retrieve relevant detailed vehicle and/or individual information based at least partly on the user input. The system 120 can also provide a more interactive and detailed way for the user to view such information.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
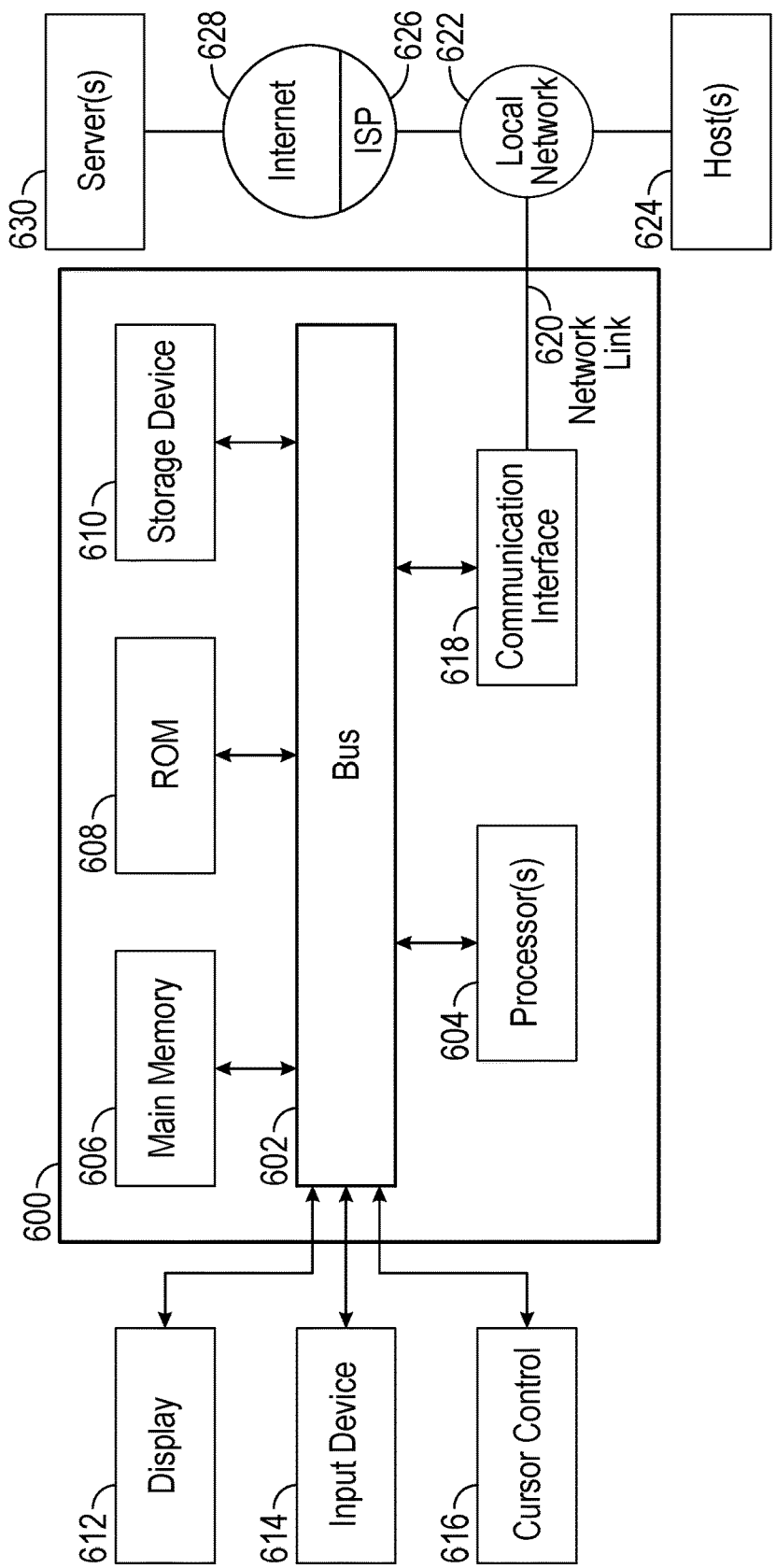
FIG. 6 illustrates a computer system with which certain methods discussed herein may be implemented.

For example, FIG. 6 is a block diagram that illustrates a computer system 600 upon which various embodiments of the system 120 may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. In some embodiments, the main memory 606 can be the data store 122.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor. Users can use the display 612, the input device 614, and/or the cursor control 616 to view, input, update, and/or change displayed passing information generated by the system 120.

Computing system 600 may include a user interface module (e.g., the UI management engine 128) to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data (e.g., data items associated with an marker) on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions.

The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 830 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets). In an example embodiment, when configured as monitoring device 150, computer system 800 hosts a web server serving an HTML-based user interface to analysts connecting through a remote device.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a computer readable storage medium having embodied thereon program instructions; and
one or more processors configured to execute the program instructions to cause the system to:
generate user interface data configured to be rendered as an interactive user interface including:
a first portion including an interactive bubble chart configured to display a first set of passing information related to instances of a first individual passing a first plurality of markers, wherein the bubble chart comprises:
indications of one or more days of the week along a first axis;
indications of one or more time periods within a day along a second axis orthogonal to the first axis; and
at each of a first set of intersections of respective days and time periods, indications in a first format of a quantity of the first individual passing at least one of the first plurality of markers in a respective time period on a respective day of a week, the first set of intersections being determined based on the first set of passing information;
a second portion including a selectable user interface element for providing one or more search criteria for identifying other individuals in a search for other individuals with passings related to passings of the first individual;
receive a first user input providing one or more search criteria via the second portion of the user interface;
in response to the first user input:
determine, based at least in part on the one or more search criteria, one or more other individuals with passings related to the passings of the first individual;
display a list of the one or more other individuals in a third portion of the interactive user interface;
receive a second user input selecting a second individual from the list of the one or more other individuals;
determine a second set of passing information related to one or more instances of the second individual passing the first plurality of markers;
update the bubble chart included in the first portion of the interactive user interface to include:
at each of a second set of intersections of respective days and time periods, indications in a second format of a quantity of the second individual passing at least one of the first plurality of markers in a respective time period on a respective day of a week, the second set of intersections being determined based at least partly on the second set of passing information.

2. The system of claim 1, wherein the one or more processors are configured to execute the program instructions to further cause the system to:
receive a third user input to view detailed information related to at least one of: a passing or a marker;
determine a set of detailed vehicle information related to a group of passings based at least on the third user input, wherein the group of passings comprises at least one of: a passing of the first individual or a passing of the second individual;
generate user interface data configured to be rendered as a second interactive user interface including:
a first portion of the second interactive user interface including an interactive table configured to display the set of detailed vehicle information, wherein the interactive table includes:
a plurality of rows corresponding to different time periods;
a plurality of columns corresponding to one or more lanes associated with the marker; and
a plurality of cells corresponding to combinations of the rows and columns,
wherein:
the cells include indications of vehicles crossing the marker in the respective lanes and at the respective time periods,
the indications including detailed vehicle information of the vehicles including at least one of: a color, a date of the passing, a time of the passing, a make, a model, or a license plate number;
a second portion of the second interactive user interface for providing one or more filter criteria.

3. The system of claim 1, wherein the one or more search criteria include at least one of: an indication of a minimum or a maximum number of co-passings of other individuals with the first individual, an indication of a minimum or maximum number of instances of passings of other individuals independent from the instances of the first individual passing the plurality of markers, an indication of a minimum or a maximum time interval between passings of other individuals and the first individual, an indication of inclusion of other vehicles in the search in addition to individuals, or an indication of inclusion of other markers in the search.

4. The system of claim 1, wherein the one or more processors are further configured to execute the program instructions to cause the system to update the second portion of the interactive user interface to display the first set of passing information related to instances of the first individual and the second set of passing information related to instances of the second individual in one or more other interactive user interface elements, the one or more other interactive user interface elements comprising at least one of: an interactive timeline, an interactive table, or an interactive bar chart.

5. The system of claim 4, wherein the one or more processors are further configured to execute the program instructions to:
receive a fourth user input selecting a bubble in the interactive bubble chart;
determine a subset of the first set of passing information related to instances of the first individual of the selected bubble; and
update the second portion of the interactive user interface to highlight the subset of the first passing information related to instance of the first individual in the interactive timeline, the interactive table, and/or the interactive bar chart.

6. The system of claim 1, wherein the one or more processors are further configured to execute the program instructions to:
rank the one or more other individuals with passings related to the passings of the first individual based at least partly on one or more decision rules; and
update the interactive user interface to display the list of the one or more other individuals based on the ranking.

7. The system of claim 6, wherein the one or more processors are further configured to:
receive a fifth user input selecting one of the list of other individuals; and
update the interactive user interface to generate a pop-up user interface for displaying an explanation of a ranking of the selected individual.

8. The system of claim 1, wherein the one or more filter criteria includes lane filter criteria and visual filter criteria, and wherein the indications associated with the first individual and the indications associated with the second individual are configured to overlap one another in the bubble chart, if needed.

9. The system of claim 8, wherein the lane filter criteria include at least one of: a marker, a date or a time and wherein the visual filter criteria include at least one of: a color, a model, a license plate number, or a VIN number.

10. The system of claim 9, wherein the one or more processors are further configured to:
receive a color selection from the user;
determine one or more vehicles based at least partly on the color selection; and
highlight detailed vehicle information associated with the one or more vehicles in the interactive table.

11. A computer-implemented method for processing passing information data and generating interactive user interfaces, the computer-implemented method comprising:
by one or more processors executing program instructions:
generating user interface data configured to be rendered as an interactive user interface including:
a first portion including an interactive bubble chart configured to display a first set of passing information related to instances of a first individual passing a first plurality of markers, wherein the bubble charts comprises:
indications of one or more days of the week along a first axis;
indications of one or more time periods within a day along a second axis orthogonal to the first axis; and
at each of a first set of intersections of respective days and time periods, indications in a first format of a quantity of the first individual passing at least one of the first plurality of markers in a respective time period on a respective day of a week, the first set of intersections being determined based on the first set of passing information;
a second portion including a selectable user interface element for providing one or more search criteria for identifying other individuals in a search for other individuals with passings in some way related to passings of the first individual;

receiving a first user input providing one or more search criteria via the second portion of the user interface;

in response to the first user input:

determining, based at least in part on the one or more search criteria, one or more other individuals with passings related to the passings of the first individual;

displaying a list of the one or more other individuals in a third portion of the interactive user interface;

receiving a second user input selecting a second individual from the list of the one or more other individuals;

determining a second set of passing information related to one or more instances of the second individual passing the first plurality of markers;

updating the bubble chart included in the first portion of the interactive user interface to include:

at each of a second set of intersections of respective days and time periods, indications in a second format of a quantity of the second individual passing at least one of the first plurality of markers in a respective time period on a respective day of a week, the second set of intersections being determined based at least partly on the second set of passing information.

12. The computer-implemented method of 11 further comprising:

by the one or more processors executing program instructions:

receiving a third user input to view detailed information related to at least one of:

a passing or a marker;

determining a set of detailed vehicle information related to a group of passings based at least on the third user input, wherein the group of passings comprises at least one of: a passing of the first individual or a passing of the second individual;

generating user interface data configured to be rendered as a second interactive user interface including:

a first portion of the second interactive user interface including an interactive table configured to display the set of detailed vehicle information, wherein the interactive table includes:

a plurality of rows corresponding to different time periods;

a plurality of columns corresponding to one or more lanes associated with the marker; and a plurality of cells corresponding to combinations of the rows and columns, wherein:

the cells include indications of vehicles crossing the marker in the respective lanes and at the respective time periods, the indications including detailed vehicle information of the vehicles including at least one of: a color, a date of the passing, a time of the passing, a make, a model, or a license plate number;

a second portion of the second interactive user interface for providing one or more filter criteria.

13. The computer-implemented method of claim 11, wherein the one or more search criteria include at least one of: an indication of a minimum or a maximum number of co-passings of other individuals with the first individual, an indication of a minimum or maximum number of instances of passings of other individuals independent from the instances of the first individual passing the plurality of markers, an indication of a minimum or a maximum time interval between passings of other individuals and the first individual, an indication of inclusion of other vehicles in the search in addition to individuals, or an indication of inclusion of other markers in the search.

14. The computer-implemented method of claim 11, wherein the one or more processors are further configured to execute the program instructions to cause the system to update the second portion of the interactive user interface to display the first set of passing information related to instances of the first individual and the second set of passing information related to instances of the second individual in one or more other interactive user interface elements, the one or more other interactive user interface elements comprising at least one of: an interactive timeline, an interactive table, or an interactive bar chart.

15. The computer-implemented method of claim 14 further comprising:

by the one or more processors executing program instructions:

receiving a fourth user input selecting a bubble in the interactive bubble chart;

determining a subset of the first set of passing information related to instances of the first individual of the selected bubble; and updating the second portion of the interactive user interface to highlight the subset of the first passing information related to instance of the first individual in the interactive timeline, the interactive table, and/or the interactive bar chart.

16. The computer-implemented method of claim 11 further comprising:

by the one or more processors executing program instructions:

weighing and ranking the one or more other individuals with passings related to the passings of the first individual based at least partly on one or more decision rules; and updating the interactive user interface to display the list of the one or more other individuals based on the ranking.

17. The computer-implemented method of claim 16 further comprising:

by the one or more processors executing program instructions:

receiving a fifth user input selecting one of the list of other individuals; and updating the interactive user interface to generate a pop-up user interface for displaying an explanation of a ranking of the selected individual.

18. The computer-implemented method of claim 11, wherein the one or more filter criteria includes lane filter criteria and visual filter criteria, and wherein the indications associated with the first individual and the indications associated with the second individual are configured to overlap one another in the bubble chart, if needed.

19. The computer-implemented method of claim 18, wherein the lane filter criteria include at least one of: a marker, a date or a time and wherein the visual filter criteria include at least one of: a color, a model, a license plate number, or a VIN number.

20. The computer-implemented method of claim 19 further comprising:
by the one or more processors executing program instructions:
receiving a color selection from the user;
determining one or more vehicles based at least partly on the color selection; and highlighting detailed vehicle information associated the one or more vehicles in the interactive table.

\* \* \* \* \*